United States Patent
Itabashi et al.

(10) Patent No.: US 12,327,316 B2
(45) Date of Patent: Jun. 10, 2025

(54) COMMUNICATION ASSISTANCE METHOD, NON-TRANSITORY COMPUTER READABLE STORAGE MEDIUM, AND COMMUNICATION SERVER FOR ASSIGNING A VIRTUAL SPACE

(71) Applicant: JAPAN TOBACCO INC., Tokyo (JP)

(72) Inventors: Masato Itabashi, Tokyo (JP); Masayoshi Saruya, Tokyo (JP); Miki Wakamatsu, Tokyo (JP); Masatoshi Senju, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/671,993

(22) Filed: Feb. 15, 2022

(65) Prior Publication Data
US 2022/0172435 A1    Jun. 2, 2022

Related U.S. Application Data

(63) Continuation of application No. PCT/JP2019/032432, filed on Aug. 20, 2019.

(51) Int. Cl.
*G06T 19/00* (2011.01)
*G06F 3/01* (2006.01)

(52) U.S. Cl.
CPC ............ *G06T 19/003* (2013.01); *G06F 3/011* (2013.01)

(58) Field of Classification Search
CPC ..... G06F 3/011; G06T 19/003; H04L 67/535; H04L 67/12; G02B 27/0172; G02B 2027/0141; A24F 40/65
See application file for complete search history.

(56) References Cited

U.S. PATENT DOCUMENTS

2019/0000147 A1*   1/2019   Koc .................. A24F 40/65

FOREIGN PATENT DOCUMENTS

| EP | 3 940 674 A1 | 1/2022 |
| JP | 2002-229920 A | 8/2002 |
| JP | 2010-535363 A | 11/2010 |
| JP | 2011-510409 A | 3/2011 |
| JP | 2014-199814 A | 10/2014 |
| JP | 2019-508026 A | 3/2019 |
| WO | WO 2008/106196 A1 | 9/2008 |

(Continued)

OTHER PUBLICATIONS

Taiwanese Office Action and Search Report for Taiwanese Application No. 108140655, dated Feb. 21, 2022, with English translation of Taiwanese Office Action.

(Continued)

*Primary Examiner* — Yaron Cohen
(74) *Attorney, Agent, or Firm* — Birch, Stewart, Kolasch & Birch, LLP

(57) ABSTRACT

In a reception step, use information which is transmitted from a user terminal in the case where a flavor suction tool is used, and indicates that the flavor suction tool is used is received. In an allocation step, on the basis of the received use information, a virtual space is allocated to the user terminal. In a transmission step, display information for displaying the virtual space is transmitted to the user terminal. In a distribution step, a message transmitted from the user terminal is distributed to another user terminal allocated to the virtual space.

8 Claims, 15 Drawing Sheets

(56) References Cited

FOREIGN PATENT DOCUMENTS

WO     WO 2009/092060 A2     7/2009
WO     WO 2017/121979 A1     7/2017

OTHER PUBLICATIONS

Extended European Search Report for European Application No. 19942018.3, dated Nov. 17, 2022.
International Search Report, issued in PCT/JP2019/032432, dated Nov. 12, 2019.
European Communication pursuant to Article 94(3) EPC for European Application No. 19 942 018.3, dated Sep. 21, 2023.
European Summons to Attend Oral Proceedings Pursuant to Rule 115(1) EPC for European Application No. 19 942 018.3, dated Jun. 25, 2024.
Extended European Search Report for European Application No. 25159608.6, dated Apr. 1, 2025.

\* cited by examiner

FIG. 11

| VIRTUAL SPACE | BACKGROUND DATA | OBJECT | USER |
|---|---|---|---|
| VS001 | BG001 | OBJ001,X1,Y1,Z1,r1,y1,p1 | USR001,X1,Y1,Z1,r1,y1,p1 |
| .... | .... | .... | .... |

FIG. 12

| USER | TERMINAL ID | STATUS INFORMATION | AVATAR MODEL | TIME OF RECEIPT | USE INFORMATION |
|---|---|---|---|---|---|
| USR001 | xxx.xxx.xxx.xxx | LOG-IN | AVT001.obj | yyyy.mm.dd hh:mm:ss | |
| . . . | . . . | . . . | . . . | . . . | . . . |

COMMUNICATION ASSISTANCE METHOD, NON-TRANSITORY COMPUTER READABLE STORAGE MEDIUM, AND COMMUNICATION SERVER FOR ASSIGNING A VIRTUAL SPACE

The present disclosure relates to a communication assistance method, a non-transitory computer readable storage medium, and a communication server. This application is a continuation application based on International Patent Application No. PCT/JP2019/032432 filed on Aug. 20, 2019, and the content of the PCT international application is incorporated herein by reference.

TECHNICAL FIELD

Background Art

A technique for adopting a virtual space into smoking is disclosed in Patent Literature 1. More specifically, the technique disclosed in Patent Literature 1 provides a user of a flavor inhaler with a realistic feeling of smoking a cigarette through an image of cigarette smoke that is in the form of a three-dimensional object displayed on a head-mounted unit on the user.

CITATION LIST

Patent Literature

Patent Literature 1: International Publication No. 2017/121979

SUMMARY OF Invention

Technical Problem

In recent times, users of flavor inhalers sometimes have to put up with limited use environments due to a continued reduction in areas in which smoking is permitted. This leads to demands for user experience of feeling as if two or more users were using their respective flavor inhalers in the same place. Although the technique disclosed in Patent Literature 1 provides users of flavor inhalers with a realistic feeling of smoking, it is required that a user be caught on a camera installed on the head-mounted unit of another user such that the users can experience the feeling of using their respective flavor inhalers in the same place.

It is an object of the present invention to provide a communication assistance method, a program, and a communication server that can provide user experience of feeling as if two or more users were using their respective flavor inhalers in the same place, irrespective of their actual use environments.

Solution to Problem

According to a first aspect of the present invention, a communication assistance method includes: a reception step for receiving use information provided as a notification that a flavor inhaler is currently in use, the use information being transmitted by a user terminal when the flavor inhaler is used; an assignment step for assigning a virtual space to the user terminal on the basis of the use information received; a transmission step for transmitting, to the user terminal, display information for displaying the virtual space; and a delivery step for delivering, to another user terminal assigned with the virtual space, a message transmitted by the user terminal.

According to a second aspect of the present invention, a non-transitory computer readable storage medium having a program causes a computer to perform: a reception step for receiving use information transmitted by a user terminal on the basis of an act of using a flavor inhaler; an assignment step for assigning a virtual space to the user terminal on the basis of the use information received; a transmission step for transmitting, to the user terminal, display information for displaying the virtual space; and a delivery step for delivering, to another user terminal assigned with the virtual space, a message received from the user terminal.

According to a third aspect of the present invention, a communication server includes: a communications unit configured to receive use information transmitted by a user terminal on the basis of an act of using a flavor inhaler; and an assignment unit configured to assign a virtual space to the user terminal on the basis of the use information received. The communications unit transmits, to the user terminal, display information for displaying the virtual space and delivers, to another user terminal assigned with the virtual space, a message received from the user terminal.

Advantageous Effects of Invention

The communication assistance method and such according to at least one of these aspects of the prevent invention can provide various user experiences of using flavor inhalers.

BRIEF DESCRIPTION OF DRAWINGS

FIG. 9 illustrates an example of how the display on the user terminal according to the first embodiment looks like.

FIG. 11 illustrates examples of information stored by a virtual space storage unit according to the first embodiment.

FIG. 12 illustrates examples of information stored by a user information storage unit according to the first embodiment.

DESCRIPTION OF EMBODIMENTS

First Embodiment

Configuration of Communication System

Hereinafter, embodiments of the present invention will be described in detail with reference to the accompanying drawings.

Figure 1:
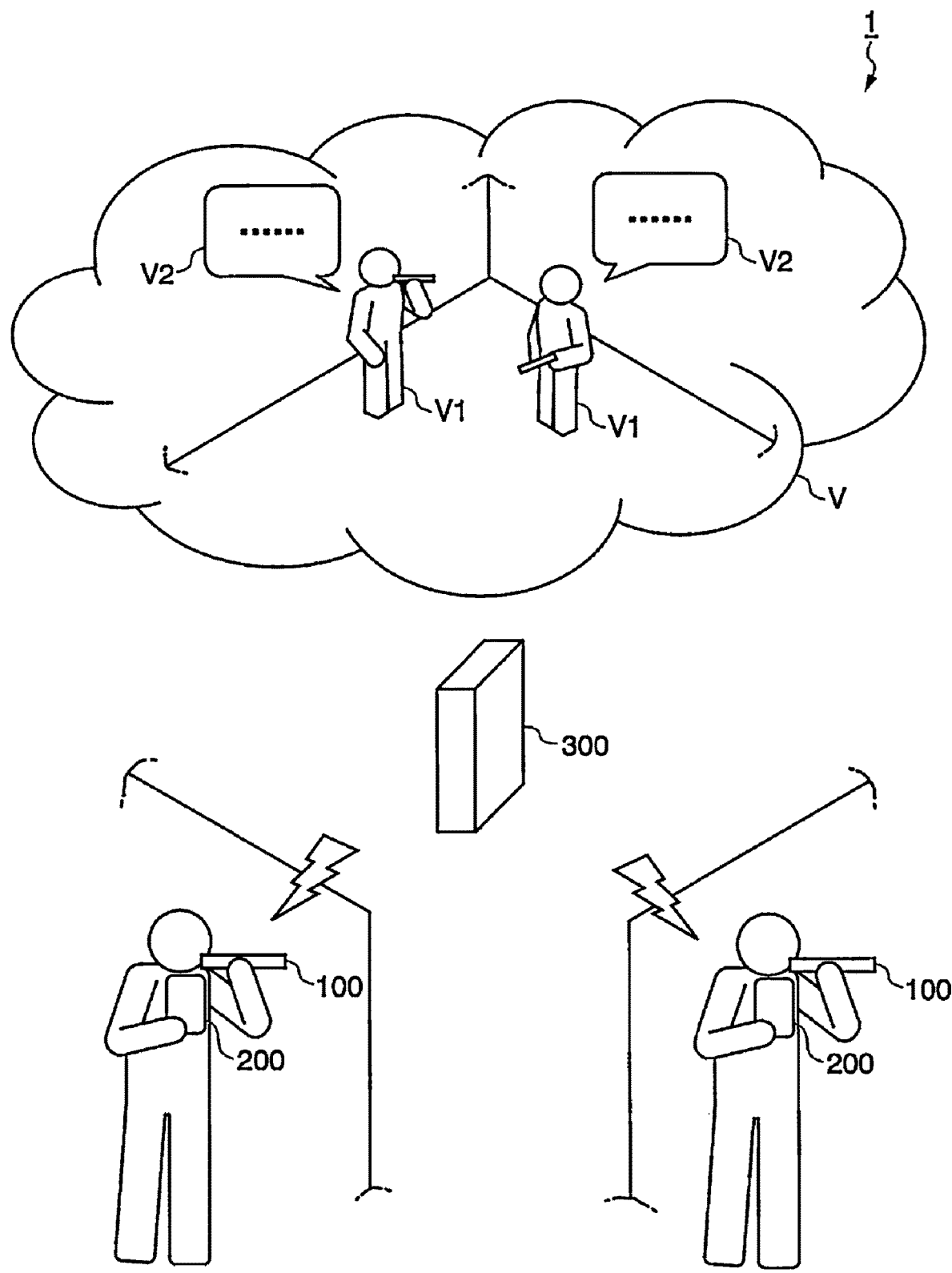
FIG. 1 illustrates an example of a communication system according to a first embodiment.

FIG. 1 illustrates an example of a communication system according to a first embodiment. A communication system 1 according to the first embodiment includes flavor inhalers 100, user terminals 200, and a communication server 300. Each flavor inhaler 100 and the corresponding user terminal 200 communicate with each other by means of, for example, short-distance wireless communications. Each user terminal 200 and the communication server 300 communicate with each other by means of, for example, wireless communications.

Each flavor inhaler 100 transmits use information to the corresponding user terminal 200 by means of, for example, short-distance wireless communications to provide a notification that the flavor inhaler 100 is currently in use. The user terminal 200 transmits the received use information to the communication server 300 by means of, for example, wireless communications.

Upon receipt of the use information, the communication server 300 assigns a virtual space to the user terminal 200 and transmits display information for displaying the virtual space to the user terminal 200 by means of wireless communications. The communication server 300 transmits the display information for displaying the virtual space also to the other user terminals 200 by means of wireless communications. The user terminal 200 displays the virtual space on the basis of the received display information.

The user terminal 200 transmits a message to the communication server 300 by means of wireless communications. Upon receipt of the message, the communication server 300 transmits, by means of wireless communications to the other user terminals 200 assigned with the virtual space, display information for displaying the message in the virtual space. Each user terminal 200 displays the message in the virtual space on the basis of the received display information; or more specifically, each user terminal 200 displays communication information in the form of an object representing the message.

According to the first embodiment, when the communication server 300 is informed of the use of the flavor inhaler 100, the communication server 300 places, in a virtual space V, an avatar V1 representing the user of the flavor inhaler 100 and causes the user terminal 200 to display the image or the like of the virtual space V. When another flavor inhaler 100 is used concurrently with the aforementioned flavor inhaler 100, the user of the flavor inhaler 100 concerned is also represented by the corresponding avatar V1 placed in the virtual space V. As communication information V2, messages sent from the individual users are also displayed in the virtual space V. The individual users can thus feel as if they were using their respective flavor inhalers 100 in the same place, irrespective of their actual use environments.

The term "use information" may herein refer to various types of use information that can be acquired by the flavor inhaler 100. The use information concerns the use of a flavor inhaler, and examples of the use information include: the frequency of use; the amount of use; and/or the fact that the flavor inhaler is used. The use information is not limited to the above and may also concern the state in which the flavor inhaler 100 is used. Examples of the information on the state in which the flavor inhaler 100 is used include: the duration of the use of the flavor inhaler 100; the charge status and the remaining power of a battery included in the flavor inhaler 100; the position of the flavor inhaler 100 (the user); the installation of a tailor-made capsule into the flavor inhaler 100; and the length of time that the flavor inhaler 100 is carried or held. The use information may also concern the number of puff actions, the number of instances in which a refill is replaced with another, and the amount liquid consumed or remaining. The refill is a replaceable member, such as a reservoir, a flavor source, a smoking article 140, and various types of atomizers, and is included in the flavor inhaler 100. The use information may be acquired by various types of sensors included in the flavor inhaler 100.

The term "virtual space" herein refers to a virtualized space that is displayed on the user terminal 200. For example, the virtual space may be a three-dimensional or two-dimensional space modeled on a smoking room or a region of scenic beauty. The virtual space V is not limited to a smoking room or a region of scenic beauty and may be any other region or place. It is not required that the virtual space V be based on an actual place; that is, the virtual space V may be based on any imaginary region or place that is not physically existing. It is not required that the virtual space V be a three-dimensional space; that is, the virtual space V may be a two-dimensional space. The virtual space V may be anything that can be displayed on the user terminal 200.

The term "message" herein refers to various kinds of information transmitted by the user terminal 200 and include, for example, textual information, audio information, information in the form of a moving image, or information in the form of a still image. The message may include information in the form of a still image, information in the form of a moving image, or audio information corresponding to a predetermined character, such as an avatar that will be described below. The message may include a uniform resource locator (URL) or a QR code (registered trademark) for a predetermined homepage on the Internet. The message may include a Morse code signal or a predetermined encrypted signal. The message may be various kinds of information for transmission from the user associated with one user terminal 200 to the user associated with another user terminal 200. Examples of the message is not limited to those mentioned above, and the message may include, for example, advertisement information, failure information, or a coupon for a discount on an attachment for the flavor inhaler 100.

Operation of Communication System

Figure 2:
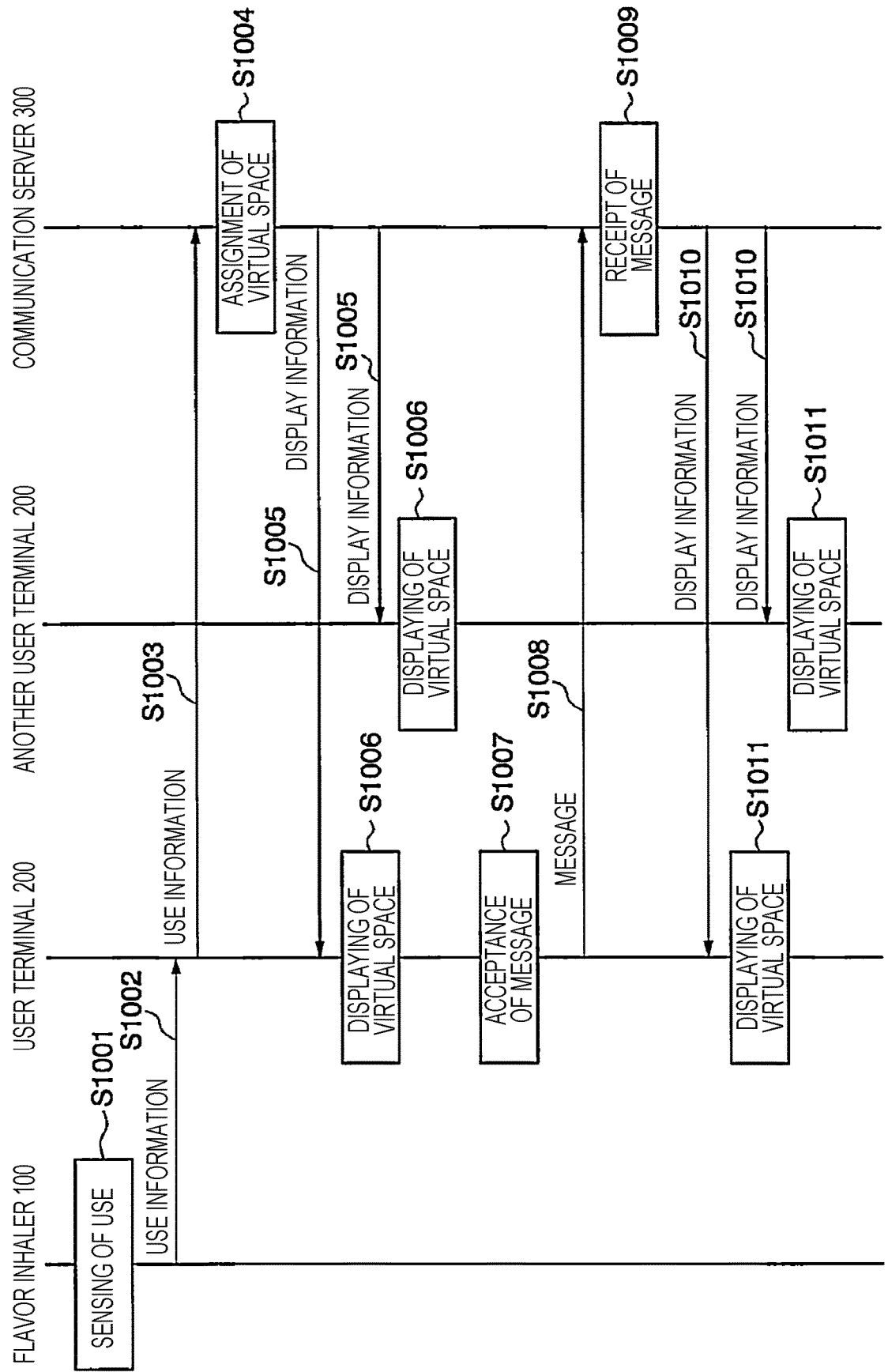
FIG. 2 is a sequence diagram illustrating an operation example of the communication system according to the first embodiment.

FIG. 2 is a sequence diagram illustrating an operation example of the communication system 1 according to the first embodiment. Referring to the sequence diagram in FIG. 2, the receipt of use information triggers the communication server 300 to assign a virtual space to the user terminal 200. The sequence diagram in FIG. 2 illustrates an example of the operation of the communication system 1, and the trigger for the assignment of a virtual space is not limited to the receipt of use information. For example, a login performed by the user terminal 200 to access the communication system 1 may trigger the communication server 300 to assign a virtual space to the user terminal 200. In place of the receipt of the use information, the receipt of predetermined information may trigger the communication server 300 to assign a virtual space to the user terminal 200. Examples of the predetermined information include: information provided to indicate the presence of the flavor inhaler 100 and/or the user terminal 200 in a predetermined space (e.g., a real-world smoking room); information provided to indicate that a predetermined time has come; and information provided to indicate a press on a switch of the flavor inhaler 100. The predetermined space may be any place in which the use of the flavor inhaler 100 is not prohibited. Examples of the predetermined space include: a real-world smoking room, a space in a house, and a space in any other building in which the use of the flavor inhaler 100 is permitted; a space in a car or any other vehicle in which the use of the flavor inhaler 100 is permitted; a space in a store in which the use of the flavor inhaler 100 is permitted; a smoking lounge that can be found in various types of stores where the use of the flavor inhaler 100 is otherwise prohibited; and a zone and a region in which the use of the flavor inhaler 100 is permitted. The predetermined space may be a point specified by using lines of latitude and longitude or may be a region shown on a map.

On the basis of the fact that the user's inhalation (puff) action is sensed (S1001), the flavor inhaler 100 transmits use information to the user terminal 200 by means of, for example, short-distance wireless communications (S1002). The user terminal 200 transmits the use information to the communication server 300 by means of, for example, wireless communications (S1003).

On the basis of the receipt of the use information, the communication server 300 assigns a virtual space to the user terminal 200 (S1004) and transmits display information for displaying the virtual space to the user terminal 200 by means of wireless communications (S1005). The user terminal 200 displays the virtual space on the basis of the received display information (S1006).

The user terminal 200 accepts a message input by the user of the user terminal 200 (S1007) and transmits the message to the communication server 300 (S1008) by means of wireless communications.

Upon receipt of the message (S1009), the communication server 300 transmits, by means of wireless communications to the user terminals 200 assigned with the same virtual space, display information for displaying the message in the virtual space (S1010). Each user terminal 200 displays the message in the virtual space on the basis of the received display information (S1011).

The following describes the flavor inhaler 100, the user terminals 200, and the communication server 300 that are included in the communication system 1.

Configuration of Flavor Inhaler

The flavor inhaler 100 is a tool for inhaling flavor and is intended as, for example, an electronic cigarette, heat-not-burn tobacco, or conventional tobacco, but is not limited thereto. The flavor inhaler 100 includes an aerosol generation device that enables inhalation of generated aerosol. The aerosol generation device is intended as, for example, an electric cigarette, heat-not-burn tobacco, or a medical nebulizer. More specifically, the aerosol generation device is a device for generating aerosol by atomizing a liquid (aerosol source) under electric power. Aerosol is a mist of an aerosol source and is in the form of particulates small enough to be suspended in gas. The aerosol generation device may generate aerosol that has a flavor. Examples of the aerosol generation device include heat-not-burn tobacco (T-vapor products and tobacco-infused vapor products) and electronic cigarettes (E-vapor products). The aerosol generation device may involve direct heating of tobacco (direct heat type), indirect heating of tobacco (indirect heat type), or heating of a liquid (liquid type). The aerosol generation device may atomize a liquid by generating surface acoustic waves (SAWs) through the use of a piezoelectric element substrate including pairs of comb-shaped electrodes.

Figure 3:
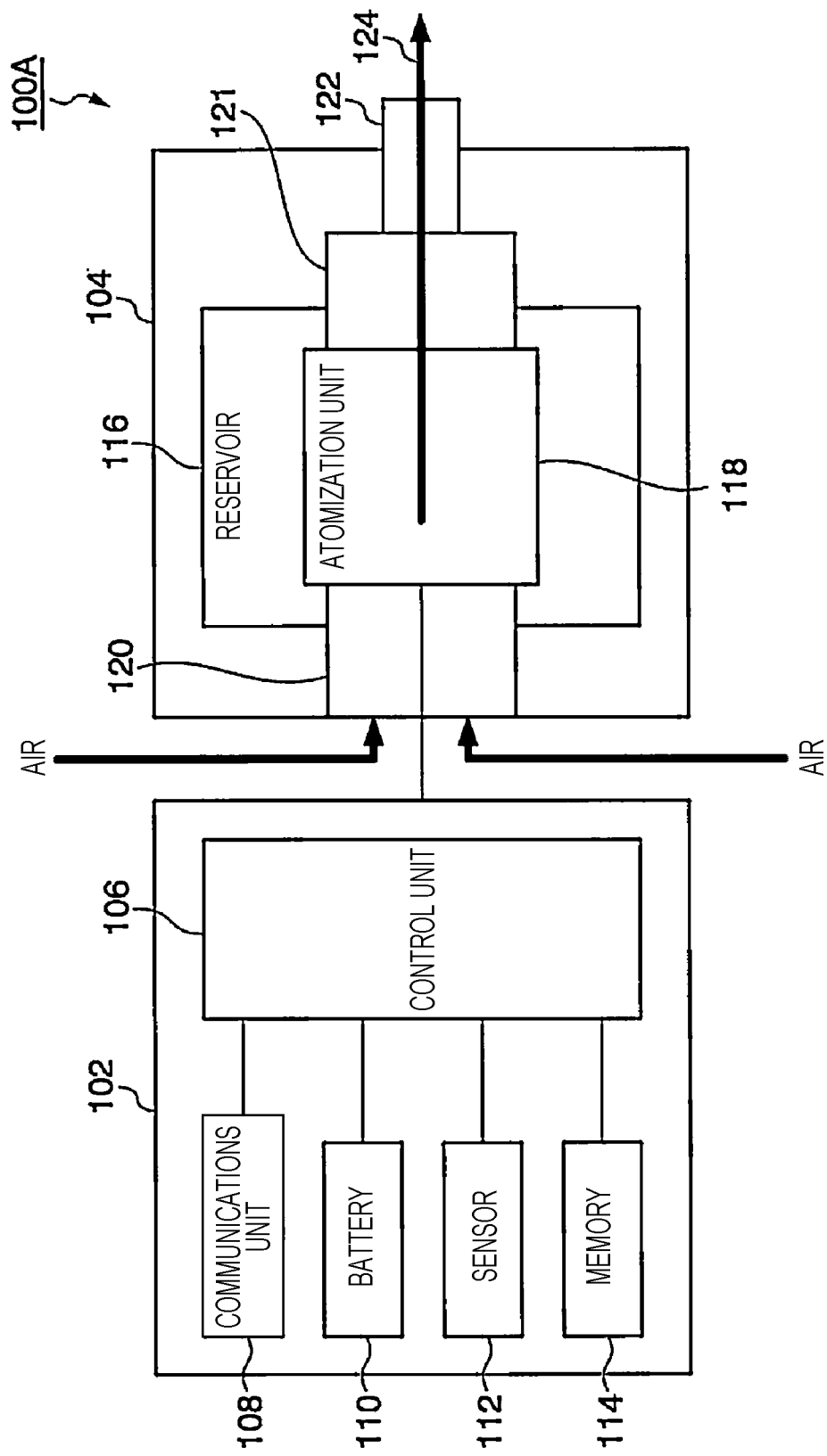
FIG. 3 is a block diagram illustrating the schematic configuration of a flavor inhaler in a first example.

FIG. 3 is a block diagram illustrating the schematic configuration of a flavor inhaler in a first example. Referring to FIG. 3, a flavor inhaler 100A in the first example includes a first member 102 and a second member 104. As illustrated in the diagram, the first member 102 may include, for example, a control unit 106, a communications unit 108, a battery 110, a sensor 112, and a memory 114.

The second member 104 may include, for example, a reservoir 116, an atomization unit 118, an air intake flow path 120, an aerosol flow path 121, and an inhalation part 122. One or some of the components in the first member 102 may be included in the second member 104. One or some of the components in the second member 104 may be included in the first member 102. The second member 104 may be removably attached to the first member 102. Alternatively, all of the component in the first member 102 and all of the components in the second member 104 may be accommodated in the same housing instead of being included in the first member 102 or the second member 104.

The reservoir 116 retains an aerosol source. The reservoir 116 is made of, for example, a fibrous or porous material such that an aerosol source in liquid form is retained in gaps between fibers or is retained in pores of the porous material. Examples of the fibrous or porous material include cotton, fiberglass, and a tobacco raw material. The reservoir 116 may be a tank in which a liquid is stored. The aerosol source is a liquid such as polyhydric alcohol (e.g., glycerin or propylene glycol) or water. In a case in which the flavor inhaler 100A is intended for use as a medical inhalation device such as a nebulizer, a medicine that is to be breathed in by a patient may be included in the aerosol source. In some cases, a tobacco raw material or an extract from a tobacco raw material may be included in the aerosol source such that an ingredient for imparting flavor and smoke taste will be released by application of heat. The reservoir 116 may provide for replenishment of the used aerosol source. Alternatively, the reservoir 116 may be a replaceable reservoir such that it can be replaced with a new one when the aerosol source runs out. The aerosol source is not limited to a liquid and may be a solid. The reservoir 116 for retaining a solid-state aerosol source may be a hollow container made of a material other than fibrous materials and porous materials.

The atomization unit 118 is configured to generate aerosol by atomizing an aerosol source. When the sensor 112 senses an inhalation action, the atomization unit 118 generates aerosol. A wick (not illustrated) may be disposed to form a connection between the reservoir 116 and the atomization unit 118. Part of the wick leads into the reservoir 116 and is in contact with the aerosol source. The remaining part of the wick extends to the atomization unit 118. The aerosol source is transferred from the reservoir 116 to the atomization unit 118 by capillary effect of the wick. The atomization unit 118 includes, for example, a heater electrically connected to the battery 110. The heater is placed in contact with the wick or in close proximity to the wick. When an inhalation action is sensed, the control unit 106 controls the heater of the atomization unit 118 such that the aerosol source transferred through the wick is atomized by application of heat. The atomization unit 118 may be an ultrasonic atomizer that atomizes an aerosol source by using ultrasonic vibrations. The atomization unit 118 is connected with the air intake flow path 120, and the air intake flow path 120 leads to the outside of the flavor inhaler 100A. The aerosol generated in the atomization unit 118 is mixed with air taken in through the air intake flow path 120. As denoted by an arrow 124, a fluid that is a mixture of the aerosol and the air flows into the aerosol flow path 121. The aerosol flow path 121 is a tubular structure through which the fluid being a mixture of the aerosol generated by the atomization unit 118 and the air is transferred to the inhalation part 122.

The inhalation part 122 is located at the end of the aerosol flow path 121 in such a manner that the aerosol flow path 121 leads to the outside of the flavor inhaler 100A. The user performs an inhalation action with the inhalation part 122 held in his or her mouth so that the air mixed with aerosol gets into the oral cavity.

The communications unit 108 communicates with a user terminal or a computer. The communications unit 108 may include at least a network interface that is a hardware source.

The battery 110 supplies power to the individual components of the flavor inhaler 100A or, more specifically, to the communications unit 108, the sensor 112, the memory 114, and the atomization unit 118. The battery 110 may be connectable to an external power source at a given port (not illustrated) of the flavor inhaler 100A to recharge. The battery 110 may be removable by itself from the first member 102 or from the flavor inhaler 100A so that the battery 110 can be replaced with a new one. Alternatively, the first member 102 as a whole may be replaceable so that the battery 110 can be replaced with a new one.

The sensor 112 may include a pressure sensor a flow rate sensor for sensing fluctuations in the internal pressure of at least one of the air intake flow path 120 and the aerosol flow path 121 or a flow rate sensor for determining the flow rate of at least one of these paths. The sensor 112 may also include a weight sensor for determining the weight of a component such as the reservoir 116. The sensor 112 may be configured to count puff actions performed by the user of the flavor inhaler 100A. The sensor 112 may be configured to add up time periods over which the atomization unit 118 is in the energized state. The sensor 112 may be configured to determine the liquid level in the reservoir 116. The sensor 112 may be configured to determine the state of charge (SOC), the integrated current value, the voltage, and the like of the battery 110. The integrated current value may be obtained by using the current integration method or the open-circuit voltage (SOC-OCV) method. The sensor 112 may be an operation button, such as a user-operable button.

The control unit 106 may be an electronic circuit module configured as a microprocessor or a microcomputer. The control unit 106 may be configured to control the operation of the flavor inhaler 100A in accordance with computer-executable instructions stored in the memory 114. The memory 114 is a storage medium, such as ROM, RAM, or flash memory. In addition to the computer-executable instructions, data such as setting date that is needed in order to control the flavor inhaler 100A may be stored in the memory 114. For example, various pieces of data such as means of controlling the communications unit 108 (e.g., light emission, speech production, and vibration), values obtained by the sensor 112, and historical data on the heat application by the atomization unit 118 may be stored in the memory 114. The control unit 106 reads data from the memory 114 as needed and uses the data to control the flavor inhaler 100A. The control unit 106 stores data in the memory 114 as needed.

Figure 4:
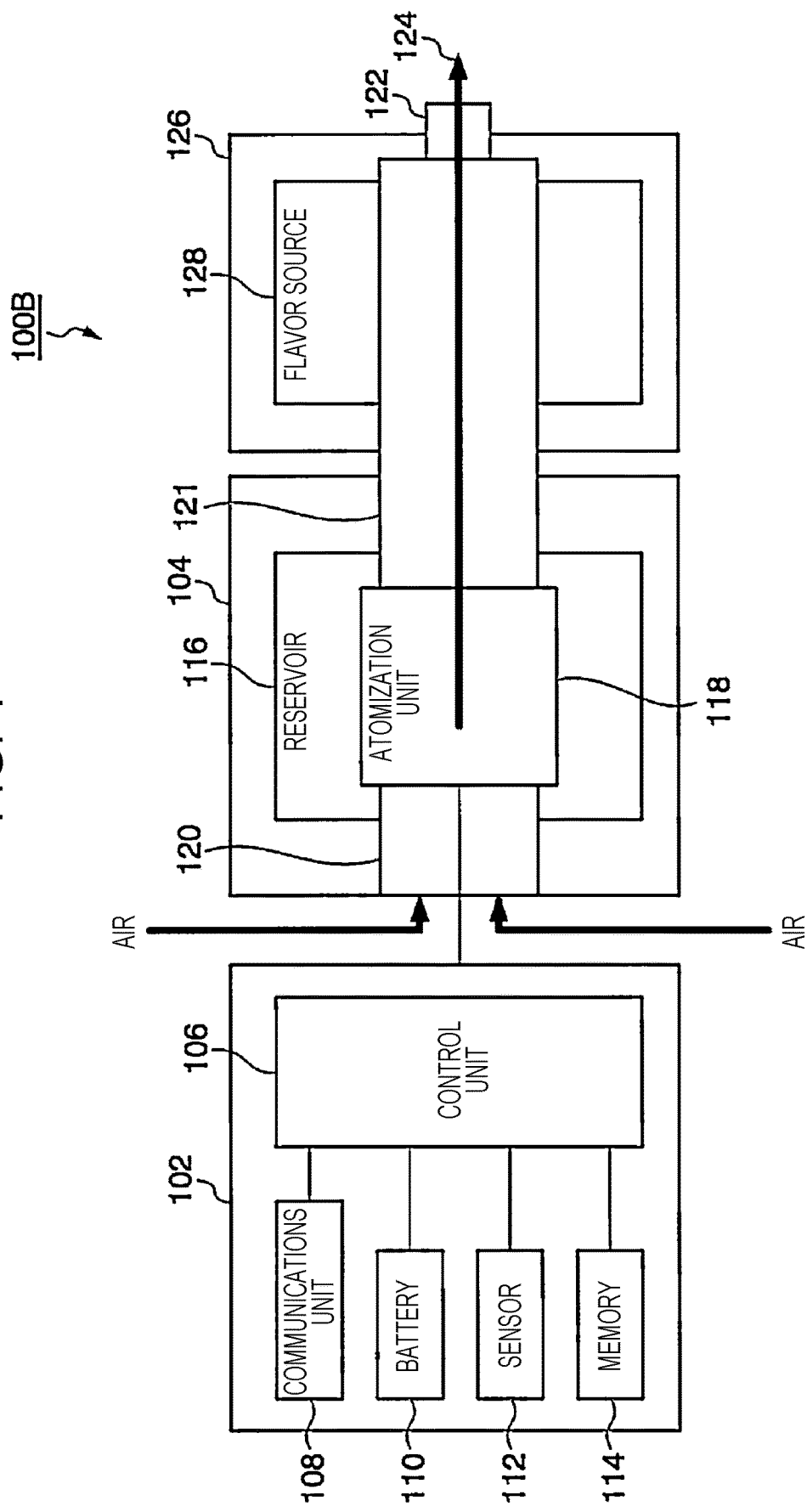
FIG. 4 is a block diagram illustrating the schematic configuration of a flavor inhaler in a second example.

FIG. 4 is a block diagram illustrating the schematic configuration of a flavor inhaler in a second example. As illustrated in the diagram, a flavor inhaler 100B in a second example includes a third member 126 as well as the components of the flavor inhaler 100A illustrated in FIG. 3. The third member 126 may include a flavor source 128. The flavor inhaler 100B may be an electronic cigarette, in which case an ingredient for imparting flavor and smoke taste may be contained in the flavor source 128. As illustrated in the diagram, the aerosol flow path 121 extends through both the second member 104 and the third member 126. The inhalation part 122 is provided to the third member 126.

The flavor source 128 is a component for giving a flavor to the aerosol. The flavor source 128 is disposed between two ends of the aerosol flow path 121. A fluid that is a mixture of aerosol generated by the atomization unit 118 and air flows through the aerosol flow path 121 and to the inhalation part 122. The fluid may be hereinafter simply referred to as aerosol. Along the stream of the aerosol, the flavor source 128 is disposed downstream of the atomization unit 118. In other words, the flavor source 128 is closer than the atomization unit 118 to the inhalation part 122 in the direction along the aerosol flow path 121. The aerosol generated by the atomization unit 118 passes through the flavor source 128 before reaching the inhalation part 122. An ingredient contained in the flavor source 128 to impart flavor and smoke taste is given to the aerosol passing through the flavor source 128. In the case that the flavor inhaler 100B is an electronic cigarette, the flavor source 128 may be a tobacco-derived flavor source such as a shredded tobacco or a tobacco raw material formed into a sheet or grains. The flavor source 128 may be a non-tobacco-derived flavor source; that is, the material of the flavor source 128 may be a plant (e.g., mint or an herb) other than tobacco. The flavor source 128 contains, for example, tobacco ingredients. The flavor source 128 may include a flavoring ingredient such as menthol. As with the flavor source 128, the reservoir 116 may include a substance containing an ingredient for imparting flavor and smoke taste. For example, a tobacco-derived flavoring substance may be contained in the flavor source 128 of the flavor inhaler 100B, and a non-tobacco-derived flavoring substance may be included in the reservoir 116 of the flavor inhaler 100B.

The user performs an inhalation action with the inhalation part 122 held in his or her mouth so that the air mixed with the flavored aerosol gets into the oral cavity.

The control unit 106 is configured to control the flavor inhaler 100 according to an embodiment of the present disclosure in various ways. The control unit 106 is also configured to generate use information concerning the flavor inhaler 100 and transmits the use information to the user terminal 200. The flavor inhaler 100 and the user terminal 200 are associated with each other in such a manner that data is transmitted bidirectionally between them by means of short-distance wireless communications, such as Bluetooth (registered trademark) and Bluetooth Low Energy (BLE). The means of transmitting data between the flavor inhaler 100 and the user terminal 200 is not limited to BLE communications and may be wireless Local Area Network (LAN), Low-Power Wide-Area Network (LPWAN), Near Field Communication (NFC), or any other communication means. The means of transmitting data between the flavor inhaler 100 and the user terminal 200 is not limited to wireless communications and may be wired communications conducted through, for example, Universal Serial Bus (USB), Mini USB, Micro USB, and Lightning. Examples of the use information include types of the flavor inhaler 100, types of flavor, the number of puff actions, and positional information.

Figure 5:
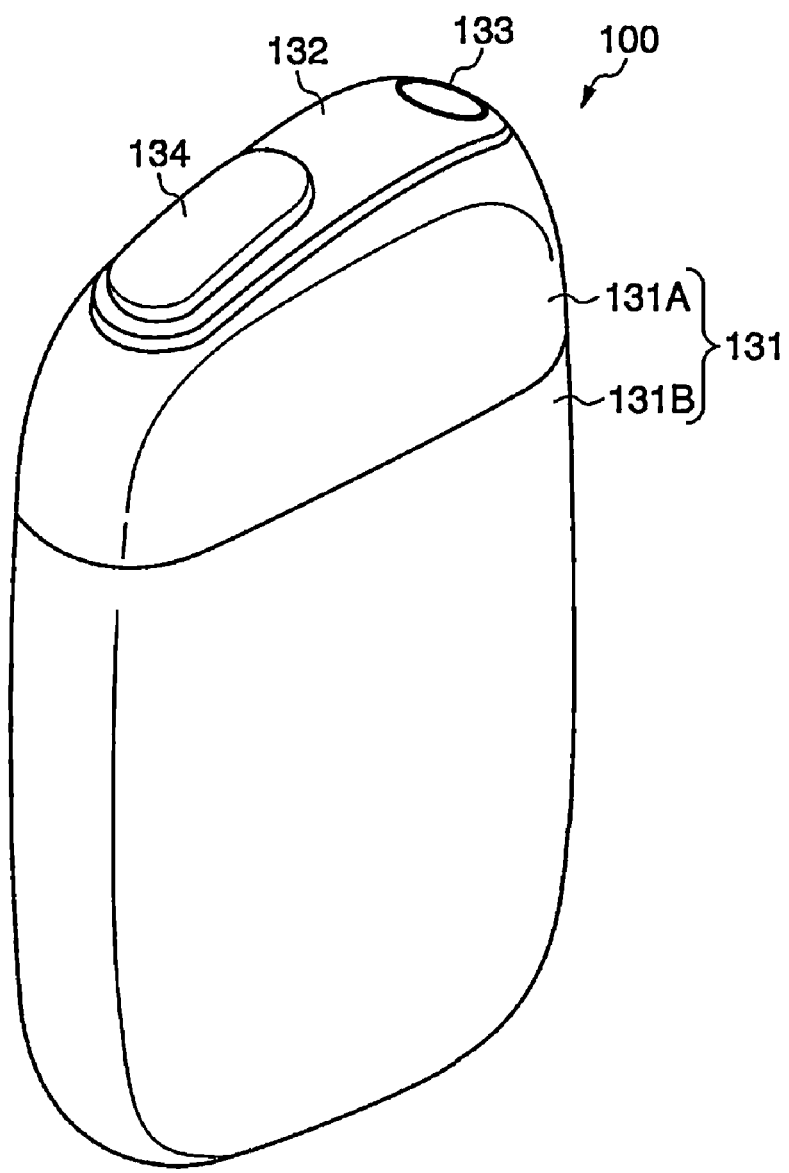
FIG. 5 is a schematic external view of the flavor inhaler.
Figure 6:
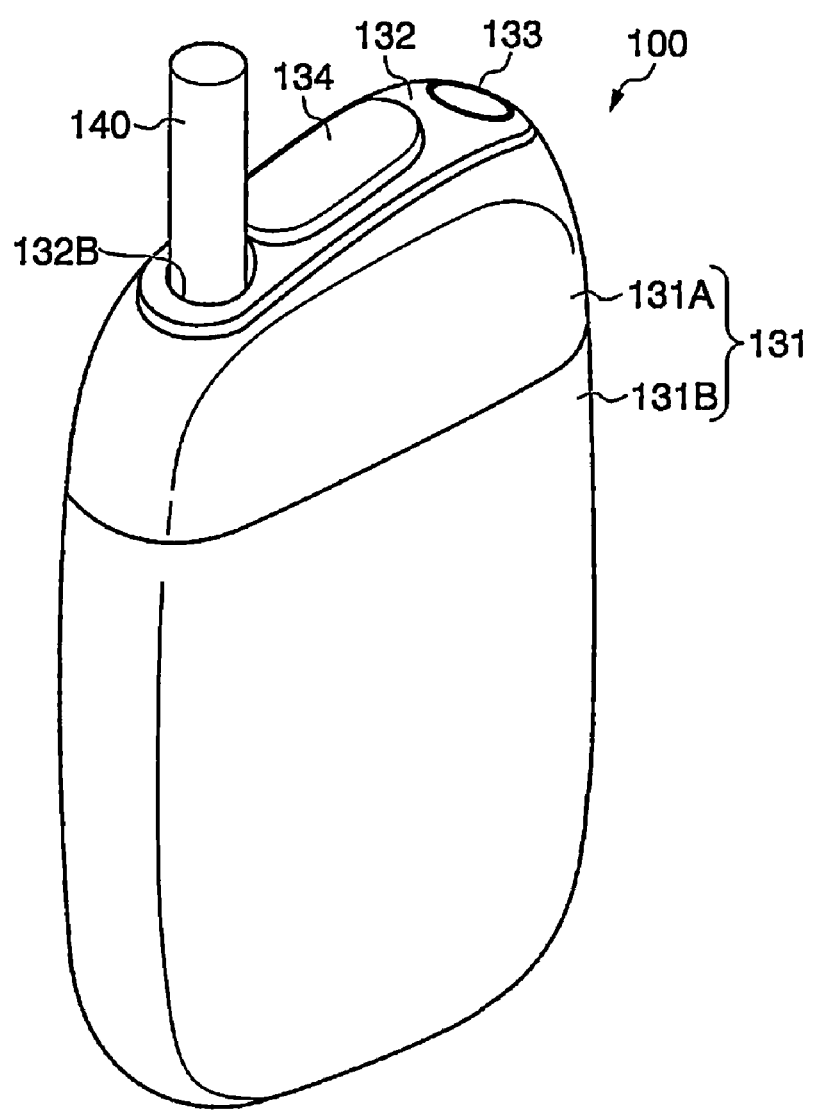
FIG. 6 is a schematic external view of the flavor inhaler, illustrating a state in which an aerosol-source material is held by the flavor inhaler.

FIG. 5 is a schematic external view of the flavor inhaler. FIG. 6 is a schematic external view of the flavor inhaler, illustrating a state in which an aerosol-source material is held by the flavor inhaler.

The flavor inhaler 100 according to the present embodiment is configured to generate flavored aerosol through application of heat to an aerosol-source material such as a smoking article. The aerosol-source material includes a flavor-source material such as a filling material containing an aerosol source and a flavor source. The smoking article 140 may be used as the aerosol-source material.

As will be understood by those skilled in the art, the smoking article 140 is just an example of the aerosol-source material. The aerosol source contained in the aerosol-source material may be a solid or a liquid. The aerosol source may be a liquid such as polyhydric alcohol (e.g., glycerin or propylene glycol) or water. A tobacco raw material or an extract from such a tobacco raw material may be included in the aerosol source such that an ingredient for imparting flavor and smoke taste will be released by application of heat. In a case in which the flavor inhaler 100 is intended for use as a medical inhalation device such as a nebulizer, a medicine that is to be breathed in by a patient may be included in the aerosol source. For the flavor inhaler 100 intended for certain uses, it is not required that a flavor source be contained in the aerosol-source material.

As illustrated in FIGS. 5 and 6, the flavor inhaler 100 includes a top housing 131A, a bottom housing 131B, a cover 132, a switch 133, and a lid part 134. The top housing 131A and the bottom housing 131B are connected to each other to constitute a housing 131, which is the outermost part of the flavor inhaler 100. The housing 131 may be small enough to fit in a hand of the user, in which case the user of the flavor inhaler 100 can inhale aerosol with the flavor inhaler 100 in his or her hand.

The top housing 131A has an opening (not illustrated), and the cover 132 fits into the top housing 131A in a manner so as to close the opening. As illustrated in FIG. 6, the cover 132 has a cavity 132B, into which the smoking article 140 can be inserted. The lid part 134 enables opening and closing of the cavity 132B in the cover 132. More specifically, the lid part 134 is attached to the cover 132 and is movable along the surface of the cover 132 between a first position in which the lid part 134 closes the cavity 132B and a second position in which the lid part 134 opens the cavity 132B.

The switch 133 is used to perform on-off switching of the flavor inhaler 100. With the smoking article 140 inserted in the cavity 132B as illustrated in FIG. 6, the user turns on the switch 133 such that a heating unit (not illustrated) is powered by the battery (not illustrated) to heat the smoking article 140 without involving combustion. As the smoking article 140 is heated, aerosol is generated from the aerosol source contained in the smoking article 140, and the flavor of the flavor source gets into the aerosol. The user can inhale flavored aerosol by sucking on a portion (illustrated in FIG. 6) being part of the smoking article 140 and jutting out of the flavor inhaler 100. The direction in which the aerosol-source material such as the smoking article 140 is inserted into the cavity 132B is herein referred to as a longitudinal direction of the flavor inhaler 100.

The configuration of the flavor inhaler 100 illustrated in FIGS. 5 and 6 is just an example of the configuration of the flavor inhaler disclosed herein. The flavor inhaler disclosed herein may be implemented in various forms adapted to generation of aerosol through application of heat to an aerosol-source material containing an aerosol source so that the user can inhale the generated aerosol.

Operation of Flavor Inhaler

Figure 7:
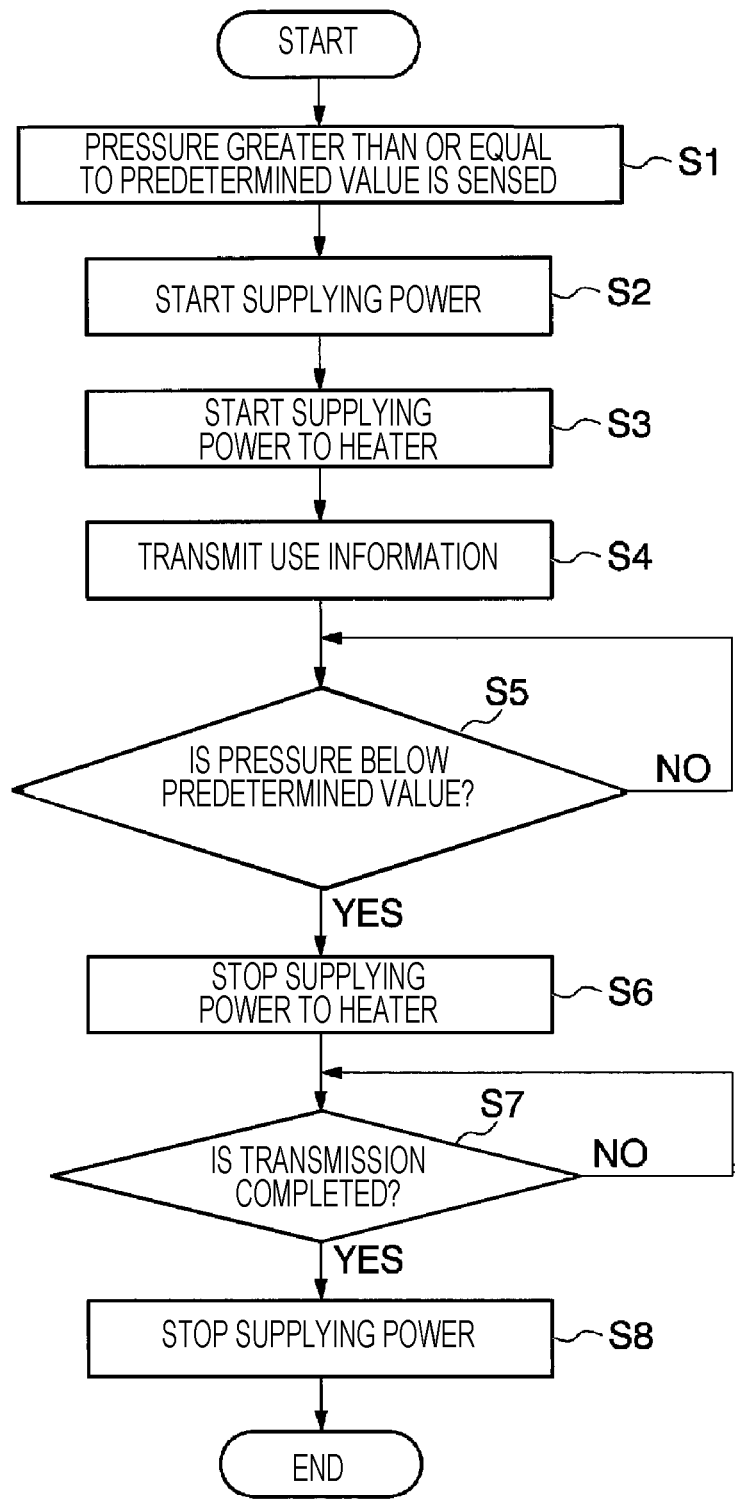
FIG. 7 is a flowchart illustrating an operation example of the flavor inhaler according to the first embodiment.

FIG. 7 is a flowchart illustrating an operation example of the flavor inhaler according to the first embodiment.

When the user starts performing an inhalation (puff) action at the inhalation part 122, internal pressure of the flavor inhaler 100 arises and is sensed by the sensor 112. When the sensor 112 senses a pressure greater than or equal to a predetermined value (Step S1), the battery 110 starts supplying power to the control unit 106 (Step S2). With the power supply, the control unit 106 is activated and causes the battery 110 to start supplying power to the heater of the atomization unit 118 (Step S3). The heater heats the aerosol source in the atomization unit 118 accordingly. The control unit 106 transmits use information concerning the flavor inhaler 100 to the user terminal 200 (Step S4).

The control unit 106 determines whether the pressure sensed by the sensor 112 is below the predetermined value (Step S5). If the pressure sensed by the sensor 112 is greater than or equal to the predetermined value (NO in Step S5), the heater is kept supplied with power. If the pressure sensed by the sensor 112 is below the predetermined value (YES in Step S5), the control unit 106 causes the battery 110 to stop supplying power to the heater (Step S6).

The control unit 106 determines whether the transmission of the use information in Step S4 is completed (Step S7). If the transmission of the use information is not completed (NO in Step S7), the control unit 106 is kept supplied with power. If the transmission of the use information is completed (YES in Step S7), the control unit 106 causes the battery 110 to stop supplying power to the control unit 106 (Step S8). That is, the control unit 106 causes a stoppage in power supply to the control unit 106 at a point in time when the sensor 112 senses that the pressure falls below the predetermined value or a point in time when the transmission of the use information is completed, whichever is later.

In this way, the control unit 106 according to the first embodiment transmits use information to the user terminal 200 every time the user performs an inhalation (puff) action. That is, the use information includes inhalation information (puff data) provided for each inhalation (puff) action performed on the flavor inhaler 100.

User Terminal

The user terminal 200 is a terminal with communications capabilities and is, for example, a smartphone or a tablet terminal. The user terminal 200 has the capability of conducting both short-distance wireless communications, such as Bluetooth (registered trademark) and NFC, and wireless communications through the Internet or any other wide area network. For example, the user terminal 200 and the flavor inhaler 100 communicate with each other by means of short-distance wireless communications, and the user terminal 200 and the communication server 300 communicate with each other through a wide area network using their wireless communications capabilities. The means of transmitting data between the user terminal 200 and the flavor inhaler 100 is not limited to short-distance wireless communications and may be wireless communications such as wireless LAN and LPWAN. The user terminal 200 may be capable of conducting wired communications through USB. The user terminal 200 may use its wired communications capabilities to communicate with the flavor inhaler 100 and may use its wired communications capabilities to communicate with the communication server 300.

As mentioned above, the user terminal 200 is, for example, a smartphone or a tablet terminal. Alternatively, the user terminal 200 may be a computer (e.g., a desktop or a laptop), a personal digital assistant (PDA), a mobile phone, a wristwatch-type terminal device, an eyeglass-type terminal, or any other type of computer. Still alternatively, the user terminal 200 may be a smart speaker (i.e., artificial-intelligence (AI) speaker) or a head-mounted display (HMD). Examples of the user terminal 200 are not limited to those mentioned above.

Figure 8:
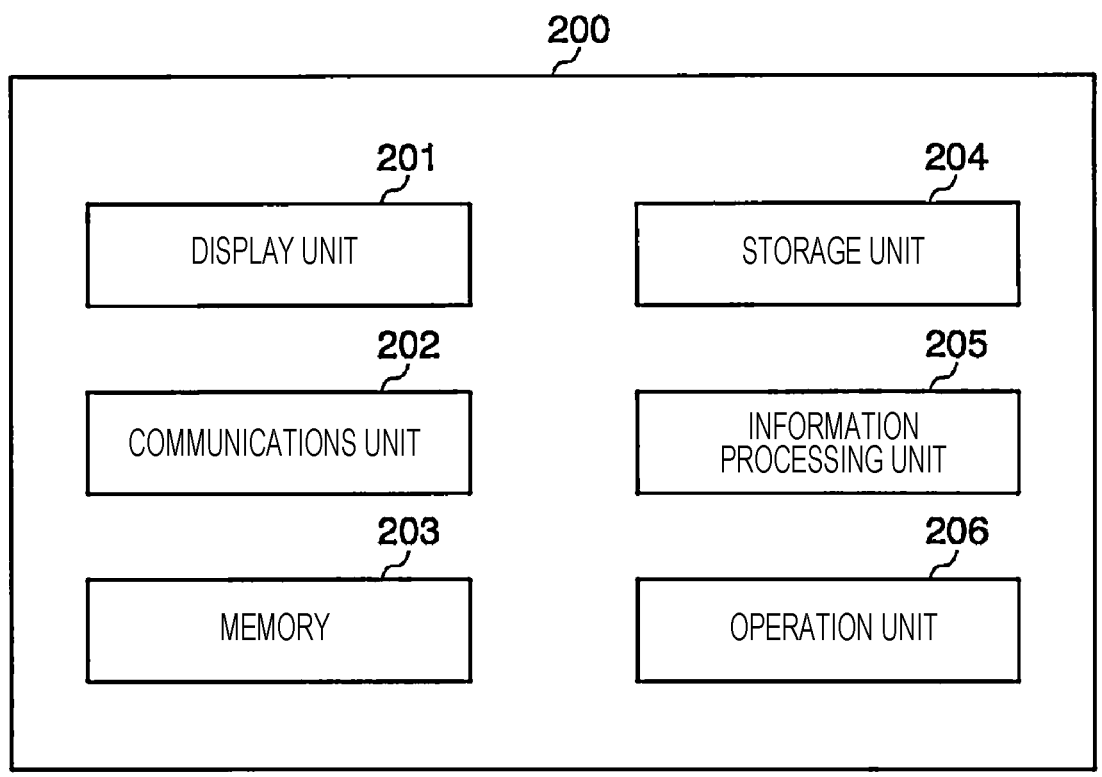
FIG. 8 is a block diagram illustrating the schematic configuration of a user terminal according to the first embodiment.

FIG. 8 is a schematic block diagram illustrating the configuration of the user terminal according to the first embodiment.

The user terminal 200 includes a display unit 201, a communications unit 202, a memory 203, a storage unit 204, an information processing unit 205, and an operation unit 206. These constituent elements are electrically connected to each other by bus lines, such as address buses and data buses.

The display unit 201 is a means for displaying various kinds of information. The display unit 201 is, for example, a display or may be in any other form that can display various kinds of display information. For example, the display unit 201 displays the virtual space V on the basis of the display information received from the communication server 300.

The communications unit 202 is implemented by a communications module. More specifically, the communications unit 202 is configured as, for example, a wireless device that conducts wireless communications by means of short-distance wireless communications or by using a wireless communications technology such as wireless LAN or LTE. Alternatively, the communications unit 202 may be configured as a device that conducts wired communications. The communications unit 202 and the flavor inhaler 100 communicate with each other by means of, for example, short-distance wireless communications. The communications unit 202 transmits use information to the user terminal 200 by means of, for example, short-distance wireless communications to provide a notification that the flavor inhaler 100 is currently in use. The communications unit 202 and the communication server 300 communicate with each other by means of, for example, wireless communications. The communications unit 202 transmits received use information and received messages to the communication server 300 by means of wireless communications. The communications unit 202 receives display information from the communication server 300 by means of wireless communications.

The memory 203 is configured as RAM that is volatile memory including a semiconductor device. The memory 203 is used as working memory for the information processing unit 205. The memory 203 is configured as, for example, flash memory. The memory 203 may be part of the storage unit 204.

The storage unit 204 is, for example, random-access memory (RAM), read-only memory (ROM), a hard disk drive (HDD), flash memory, or a hybrid storage device that is a combination of two or more of these. A program and an application are stored in the storage unit 204 and may be executed by the information processing unit 205.

The program is, for example, an operating system between hardware and the user or an application program. The program provides a standard interface for the user or the application program and manages resources such as hardware in an effective manner.

The application is an application program for enabling the user to communicate with another user through the virtual space V. The user terminal 200 executes the application program to receive use information from the flavor inhaler 100 and to transmit the use information to the communication server 300. The user can bring the virtual space V into view on the basis of the display information received from the communication server 300. The user can operate the user terminal 200 to send, to the communication server 300, a message for communication with another user. The user terminal 200 may provide these functions by executing progressive web apps (PWAs) instead of executing the native application program.

All or part of the information processing unit 205 is a functional unit (hereinafter referred to as a software functional unit) implemented by a processor such as a central processing unit (CPU) executing the program and the application stored in the storage unit 204. Alternatively, all of part of the information processing unit 205 may be implemented by hardware such as large-scale Integration (LSI), an application-specific integrated circuit (ASIC), or a field-programmable gate array (FPGA) or may be implemented by a combination of the software functional unit and hardware.

The information processing unit 205 executes the processing for transferring, to the communication server 300 by way of the communications unit 202, the use information received from the flavor inhaler 100. The information processing unit 205 also executes the processing for causing the display information received from the communication server 300 to appear on the display unit 201. Moreover, the information processing unit 205 executes the processing for causing the message input through the operation unit 206 by the user to appear on the communication server 300 by way of the communications unit 202.

The operation unit 206 is configured as, for example, a touch panel. The operation unit 206 detects a touch operation performed on a screen displayed on the display unit 201 and outputs the touch-operation detection result to the information processing unit 205.

How Display on User Terminal Looks Like

Figure 9:
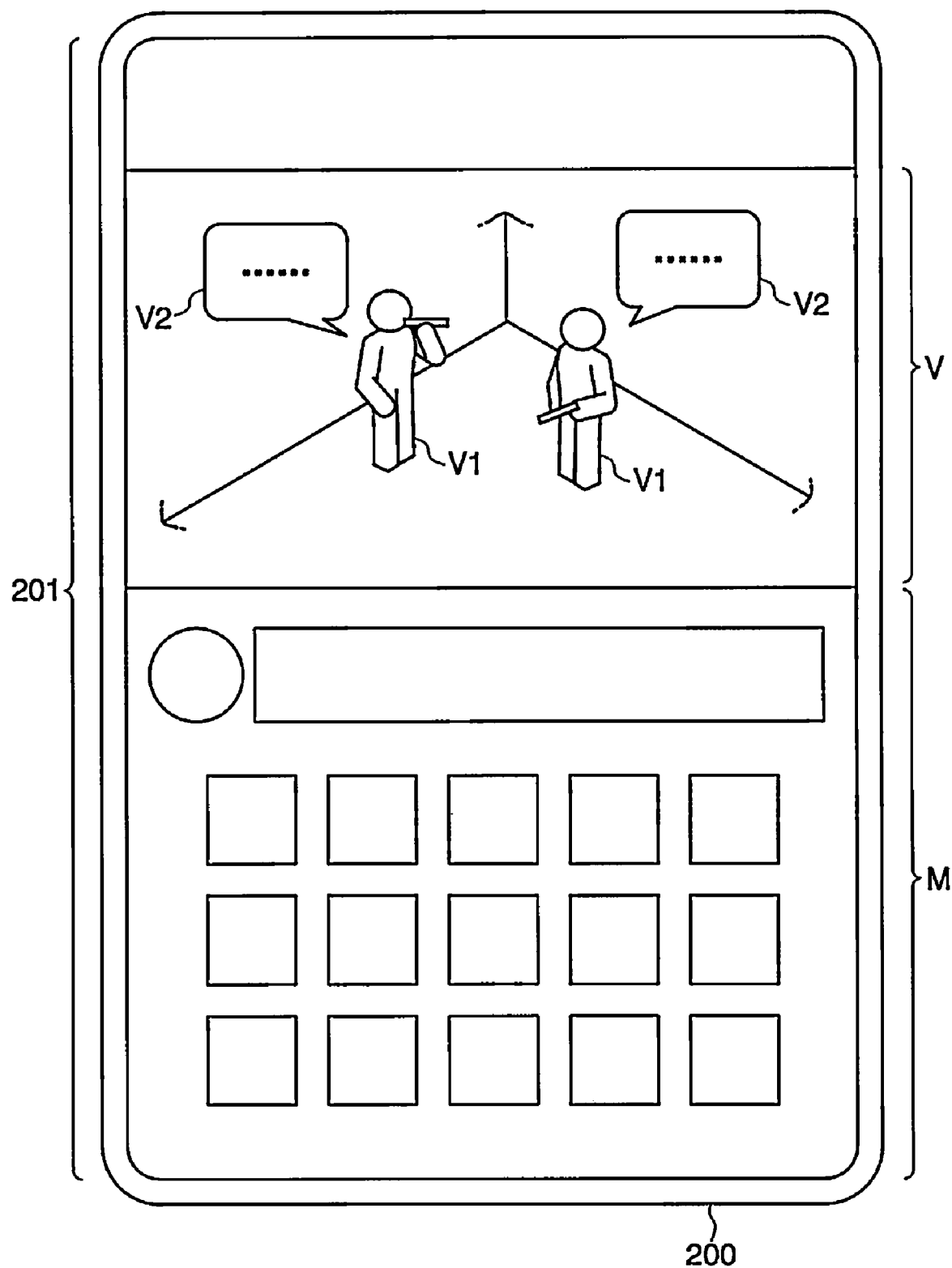

FIG. 9 illustrates an example of how the display on the display unit 201 of the user terminal 200 according to the first embodiment looks like.

The virtual space V is displayed on the display unit 201 of the user terminal 200. For example, a virtualized three-dimensional space modeled on a smoking room is displayed on the display unit 201.

The avatars V1 representing the users are placed in the virtual space V displayed on the display unit 201. The avatars V1 represent the users associated with the user terminals 200 assigned with the virtual space V. Each avatar V1 is displayed as, for example, an object in the form of a human figure. It is not required that each avatar V1 be displayed as an object in the form of a human figure; that is, each avatar V1 may be displayed as an object in the form of an imaginary character or any other object.

The avatars V1 may be capable of shifting its position in at least part of the virtual space V. The region in which the avatars V1 can shift its position may be predetermined for each virtual space V or may be the entirety of the virtual space V.

In addition, communication information is displayed (placed) in the form of objects representing messages V2 in the virtual space V displayed on the display unit 201. Displaying communication information in the form of an object representing the message V2 may be hereinafter expressed as displaying a message.

In the example illustrated in FIG. 9, the messages V2 are displayed in proximity to the avatars V1. Each message V2 is displayed in proximity to the avatar V1 representing the user who is the sender of the message V2. Each message V2 may be displayed in the form of a message balloon or may be simply displayed as a text message. When the avatar V1 shift its position within the virtual space V, each message V2 may move along with the corresponding avatar V1 within the virtual space V.

Instead of being displayed within the virtual space V, the messages V2 may be displayed in another region on the display unit 201 of the user terminal 200. The messages V2 may be displayed, for example, in chronological order or in chat format. Each message V2 may be a voice message, namely, a message output by voice or may be output in any other format or manner.

A message input part M is displayed on the display unit 201. The message input part M includes, for example, icons for use by the user of the user terminal 200 in inputting a message and a region in which the input message is displayed. The message input part M may be in any other form to which the user can input a message. It is not required that a message be input manually, and the message input part M may be adapted to voice input.

Communication Server

The communication server 300 assigns the virtual space V to the user terminal 200 on the basis of the use information concerning the flavor inhaler 100 and received from the user terminal 200. The communication server 300 transmits the display information (e.g., a moving image and a still image) of the virtual space V to the user terminal 200. The communication server 300 places the avatar V1 of the user in the virtual space V. The avatar V1 corresponds to the user. Alternatively, the avatar V1 may correspond to the user terminal 200 of the user. Upon receipt of a message from the user terminal 200, the communication server 300 transmits, to the other user terminals 200 assigned with the virtual space V, the display information for displaying the message.

Figure 10:
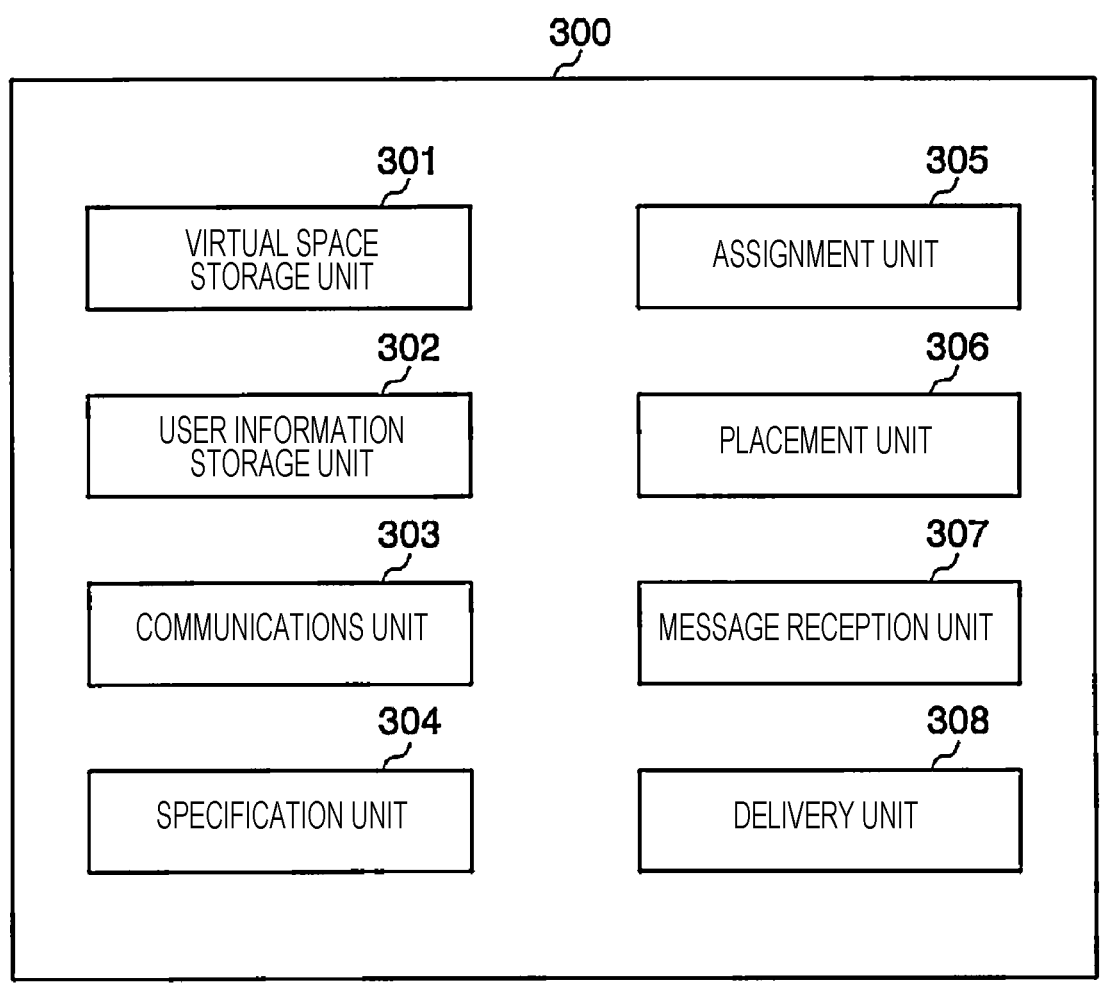
FIG. 10 is a schematic block diagram illustrating the configuration of a communication server according to the first embodiment.

FIG. 10 is a schematic block diagram illustrating the configuration of the communication server according to the first embodiment.

The communication server 300 includes a virtual space storage unit 301, a user information storage unit 302, a communications unit 303, a specification unit 304, an assignment unit 305, a placement unit 306, a message reception unit 307, and a delivery unit 308.

The virtual space storage unit 301 is, for example, random-access memory (RAM), read-only memory (ROM), a hard disk drive (HDD), flash memory, or a hybrid storage device that is a combination of two or more of these.

FIG. 11 illustrates examples of information stored by the virtual space storage unit according to the first embodiment.

The virtual space storage unit 301 stores, in connection with each virtual space V, background data concerning the virtual space V, data on objects in the virtual space V, placement information concerning (the placement and incli-nation of) the objects, information on the user having logged in to the virtual space V, and placement information concerning the avatar V1 representing the user. The background data concerning the virtual space V is for displaying, for example, a smoking room or a region of scenic beauty. The virtual space V may be a three-dimensional space or a two-dimensional space.

The user information storage unit 302 is, for example, random-access memory (RAM), read-only memory (ROM), a hard disk drive (HDD), flash memory, or a hybrid storage device that is a combination of two or more of these.

FIG. 12 illustrates examples of information stored by the user information storage unit according to the first embodiment.

The user information storage unit 302 stores, for each user, status information (a log-in status or a log-out status), identification information of the user terminal 200, model data concerning the avatar V1, the assigned virtual space V, the time of receipt of the most recent use information, and the most recently received use information.

The communications unit 303 is implemented by a communications module. More specifically, the communications unit 303 is configured as, for example, a wireless device that conducts wireless communications by using a wireless communications technology such as wireless LAN or LTE. Alternatively, the communications unit 303 may be configured as a device that conducts wired communications. The communications unit 303 receives, from the user terminal 200, use information concerning the flavor inhaler 100. The communications unit 303 records the received use information and the time of receipt on the user information storage unit 302.

On the basis of the time of receipt of the most recent use information concerning each user and stored by the user information storage unit 302, the specification unit 304 determines whether the flavor inhaler 100 is currently used by the user (or the user terminal 200). More specifically, the specification unit 304 identifies, from among different users, a user for whom the amount of time elapsed from the time of receipt of the most recent use information is less than or equal to a predetermined period of time, and the specification unit 304 determines that the person is currently using the flavor inhaler 100. That is, the specification unit 304 specifies, on the basis of the received use information, the user terminal 200 associated with the flavor inhaler 100 that is currently in use. The specification unit 304 assumes that the status information of the user (or the user terminal 200) associated with the flavor inhaler 100 in use is the log-in status.

The assignment unit 305 assigns, to one of the virtual spaces V, the user who has newly performed a login. The assignment unit 305 determines the virtual spaces V for the individual users on the basis of, for example, selections made by the users, the position of the users, the number of users, or the use information. The assignment unit 305 may determine the virtual spaces V for the individual users on the basis of random numbers, that is, at random.

In a case in which the virtual spaces V are provided on a region-by-region basis, the assignment unit 305 may determine the virtual spaces V for the individual users on the basis of positional information included in the use information. In this case, the users whose current positions are close to each other are assigned with the same virtual space V.

In a case in which the virtual spaces V are provided on an attribute-by-attribute basis, the assignment unit 305 may determine the virtual spaces V for the individual users on the basis of attribute information included in the use information. Examples of attributes include the age of the user, the gender of the user, the flavor given by the flavor inhaler 100, hobbies of the user, the nationality of the user, and the occupation of the user.

The assignment unit 305 may assign the user to the virtual space V to which another user associated with the user concerned (e.g., a friend of the user) is already assigned.

The assignment unit 305 may assign the user to the virtual space V in which the number of users is less than an upper limit and is greater than the number of users in the any other virtual space V in which the number of users is less than the upper limit. The assignment unit 305 may present more than one virtual space V to the user and may assign the user to the virtual space selected by the user. The assignment unit 305 may determine the virtual space for the user on the basis of random numbers.

The placement unit 306 places the avatar V1 corresponding to the user (or the user terminal 200) in the virtual space V assigned by the assignment unit 305. The position of the avatar V1 in the virtual space V may be determined in advance or may be freely selected. The avatar V1 may be capable of shifting its position in at least part of the virtual space V.

The message reception unit 307 receives a message from the user terminal 200. The message is an example of communication information. The message reception unit 307 may be implemented by the communications unit 303.

The delivery unit 308 delivers the display information, which is a rendering of the virtual space V and is given on the basis of the information stored by the virtual space storage unit 301, to the user terminals 200 of the users assigned with the same virtual space V. The delivery unit 308 delivers the message received by the message reception unit 307 to the user terminals 200 of the users assigned with the virtual space V to which the sender (source) of the message is assigned. The message may be delivered in the form of an object placed in the virtual space V as illustrated in FIG. 1 or may be delivered in such a manner as to appear on a chat screen separate from the virtual space V. The display information delivered by the delivery unit 308 is displayed on the user terminal 200 in like manner with the one illustrated in FIG. 9. The delivery unit 308 may be implemented by the communications unit 303.

Operation of Communication Server

Figure 13:
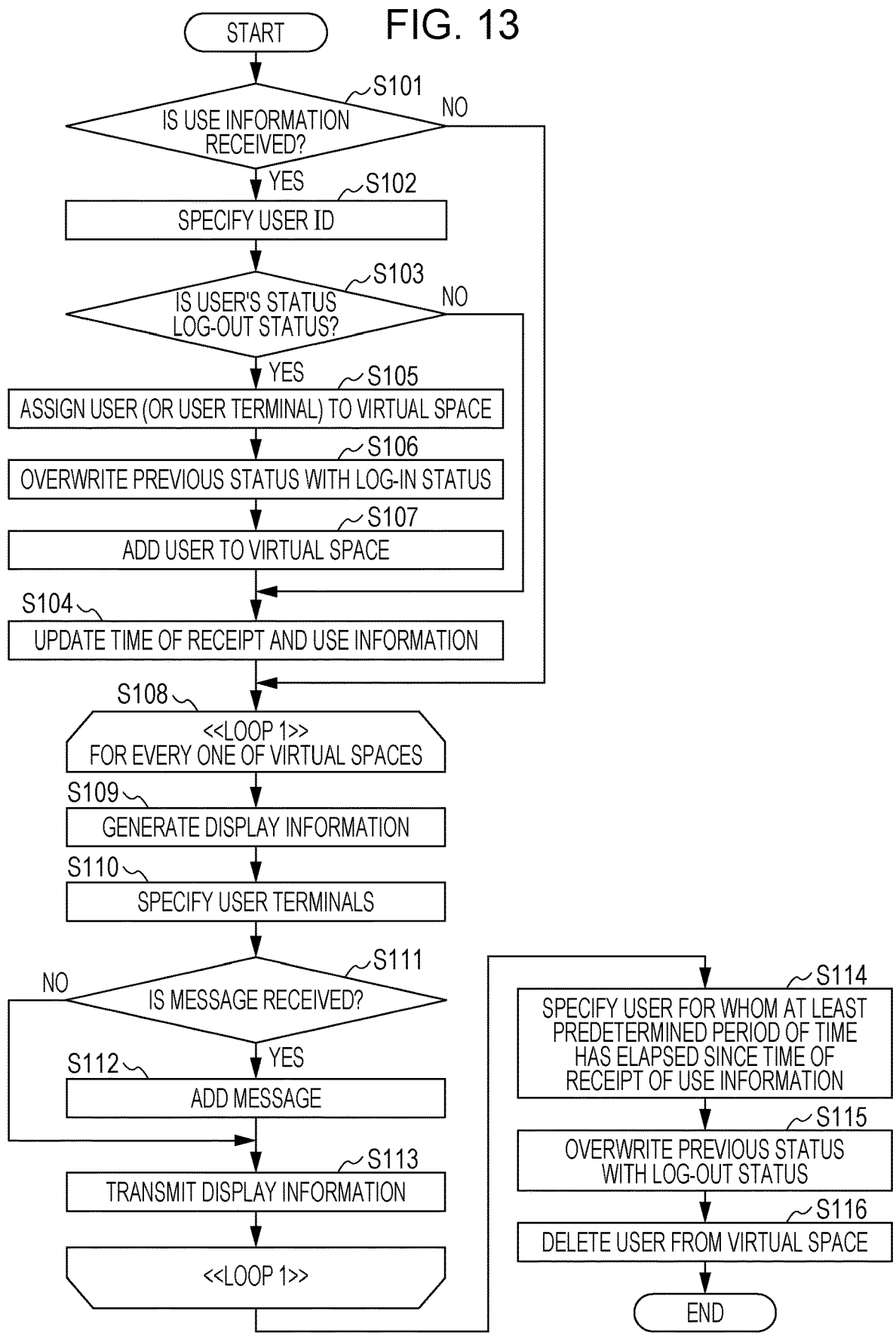
FIG. 13 is a flowchart illustrating an operation example of the communication server according to the first embodiment.

FIG. 13 is a flowchart illustrating an operation example of the communication server according to the first embodiment.

FIG. 13 illustrates an operation example for the case in which the receipt of use information triggers the communication server 300 to assign a virtual space to the user terminal 200.

The communication server 300 executes the following processing at regular intervals.

The specification unit 304 of the communication server 300 determines whether use information is newly received from the user terminal 200 (Step S101). If the communication server 300 is in receipt of use information (YES in Step S101), the specification unit 304 specifies the user identification (ID) of the sender of the received use information (Step S102). The specification unit 304 determines whether the status information associated with the user ID specified in Step S102 is the log-out status (Step S103). If the status information is the log-in status (NO in Step S103), the user tied to the user ID already logged in to the virtual space V. In this case, the specification unit 304 updates the time of receipt of the most recent use information associated with the user ID specified in Step S102 and also updates the most recently received use information (Step S104).

If the status information is the log-out status (YES in Step S103), the user (or the user terminal 200) tied to the user ID is yet to log in to the virtual space V. In this case, the assignment unit 305 assigns the user (or the user terminal 200) to one of the virtual spaces V stored by the virtual space storage unit 301 (Step S105).

The assignment unit 305 overwrites the status information stored by the user information storage unit 302 in connection with the user ID specified in Step S102; that is, the assignment unit 305 overwrites the previous status with the log-in status (Step S106). The assignment unit 305 then adds the user ID specified in Step S102 to a list of users (or the user terminals 200) that is stored by the virtual space storage unit 301 in connection with the virtual space V assigned in Step S105 (Step S107). The specification unit 304 updates the time of receipt of the most recent use information associated with the identification information of the user terminal 200 specified in Step S102 and also updates the most recently received use information (Step S104).

If the storage unit is updated on the basis of the use information or if no use information is newly received (NO in Step S101), the assignment unit 305 of the communication server 300 picks, one by one, the virtual spaces V stored by the virtual space storage unit 301 and executes, for every one of the virtual spaces V, the following processing in Steps S109 to S113 (Step S108).

The placement unit 306 generates display information for the individual virtual spaces V on the basis of information on each virtual space V picked in Step S108 from the ones stored by the virtual space storage unit 301 (Step S109). More specifically, the placement unit 306 generates the display information by following the procedure below. The placement unit 306 places background data and objects in the virtual space V stored by the virtual space storage unit 301. The placement unit 306 reads, from the user information storage unit 302, model data concerning the avatar V1 of the user associated with the virtual space V. The placement unit 306 places the avatar V1 in the virtual space V on the basis of the model data acquired by the reading. The placement unit 306 renders the virtual space V to generate display information.

The specification unit 304 specifies the users assigned with the virtual space V picked in Step S108 from those stored by the virtual space storage unit 301 and also specifies, from those stored by the user information storage unit 302, the user terminals 200 of the users concerned (Step S110).

Then, the message reception unit 307 determines whether a message is received from any one of the user terminals 200 specified in Step S110 (Step S111). If a message is received from any one of the user terminals 200 specified in Step S110 (YES in Step S111), the placement unit 306 adds the received message to the display information (Step S112). For example, the placement unit 306 places, in the display information, the communication information V2, which is an object representing the received message.

In a case in which the communication information V2 is placed in the virtual space, the delivery unit 308 delivers, to the user terminals 200 specified in Step S110, display information with the communication information V2 placed in the virtual space. In a case in which no message is received from the user terminals 200 (NO in Step S111), the delivery unit 308 delivers, to the user terminals 200 specified in Step S110, display information with no communication information V2 placed in the virtual space (Step S113).

Consequently, display information is displayed on each user terminal 200, showing the state in which the avatar V1 of oneself and the other avatars V1 are using the flavor inhalers 100 and exchanging messages in the virtual space V.

The specification unit 304 of the communication server 300 specifies, with reference to the user information storage unit 302, the user for whom at least a predetermine period of time (e.g., one hour or more) has elapsed since the time of receipt of the most recent use information (Step S114). The predetermined period of time is not limited and may be, for example, 30 seconds, one minute, or five minutes. The predetermined period of time may be set at the discretion of the user. In a case in which the predetermined period of time has elapsed since the time of receipt of the most recent message, it is highly likely that the user has already stopped using the flavor inhaler 100. The specification unit 304 overwrites the status information stored by the user information storage unit 302 in connection with the user specified in Step S114; that is, the specification unit 304 overwrites the previous status with the log-out status (Step S115). The specification unit 304 deletes, from data stored by the virtual space storage unit 301, the user ID of the user specified in Step S114 (Step S116).

Before overwriting the previous status information with the log-out status, the specification unit 304 may determine the use's willingness to log out. For example, the specification unit 304 may ask the user terminal 200 if the user terminal 200 allows or disallows the overwriting, and the specification unit 304 may overwrite the previous status information with the log-out status if the specification unit 304 is instructed to do so. The user is thus prevented from logging out while communicating with another user.

Figure 14:
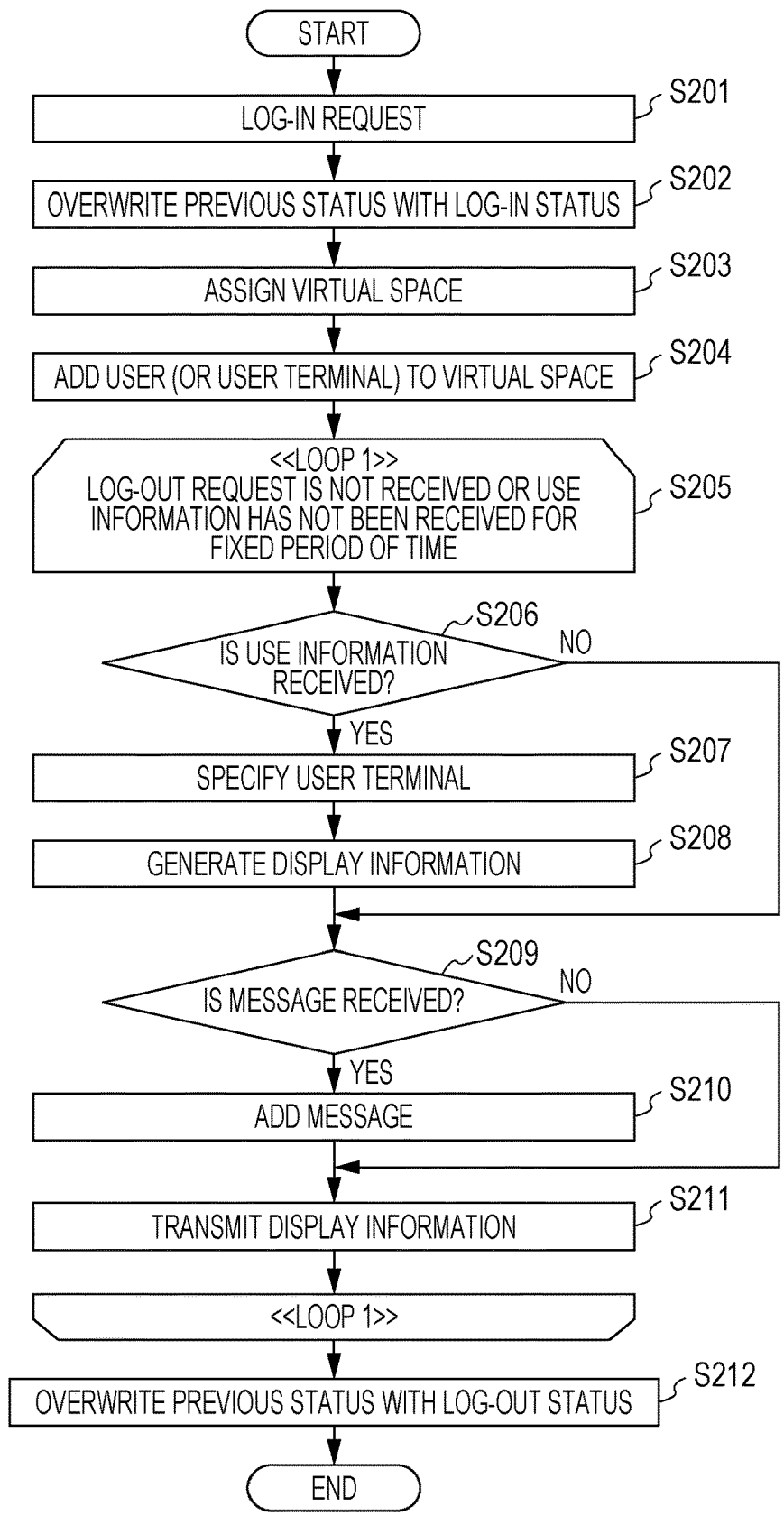
FIG. 14 is a flowchart illustrating another operation example of the communication server according to the first embodiment.

FIG. 14 is a flowchart illustrating another operation example of the communication server according to the first embodiment. FIG. 14 illustrates an operation example for the case in which a login performed by the user terminal 200 to access the communication system 1 triggers the communication server to assign a virtual space to the user terminal 200.

When a login to the communication system 1 is requested by the user terminal 200 (Step S201), the specification unit 304 of the communication server 300 overwrites the status information associated with the user ID corresponding to the user terminal 200 requesting a login; that is, the specification unit 304 overwrites the previous status information with the log-in status (Step S202). Then, the assignment unit 305 assigns the user (or the user terminal 200) to one of the virtual spaces V stored by the virtual space storage unit 301 (Step S203). The assignment unit 305 then adds the user ID corresponding to the user terminal 200 in question (the user terminal 200 requesting a login) to a list of users (or the user terminals 200) that is stored by the virtual space storage unit 301 in connection with the virtual space V assigned in Step S203 (Step S204).

Then, the communication server 300 repeats the processing in Steps S206 to S211 until a log-out request for logging out of the communication system 1 is received from the user terminal 200 or as long as use information has not been received for a predetermined period of time (e.g., one hour) (Step S205). The predetermined period of time is not limited and may be, for example, 30 seconds, one minute, or five minutes. The predetermined period of time may be set at the discretion of the user. In a case in which the predetermined period of time has elapsed since the time of receipt of the most recent message, it is highly likely that the user has already stopped using the flavor inhaler 100. The specification unit 304 overwrites the status information stored in Step S202 by the user information storage unit 302 in connection with the user ID; that is, the specification unit 304 overwrites the previous status with the log-out status (Step S212).

The specification unit 304 of the communication server 300 determines whether use information is newly received from the user terminal 200 (Step S206). If the communication server 300 is in receipt of use information (YES in Step S206), the specification unit 304 specifies the user identification (ID) of the sender of the received use information (Step S207). The placement unit 306 generates display information for the virtual space V on the basis of information on the virtual space V stored by the virtual space storage unit 301 and assigned in Step S203 (Step S208). If the communication server 300 is not in receipt of use information (NO in Step S206), the processing proceeds to Step S209.

The message reception unit 307 determines whether a message is received from the user terminal 200 specified in Step S207 (Step S209). If a message is received from the user terminal 200 (YES in Step S209), the placement unit 306 adds the received message to the display information (Step S210). For example, the placement unit 306 places, in the display information, the communication information V2, which is an object representing the received message. If no message is received (NO in Step S209), no message is added.

In a case in which the communication information V2 is placed in the virtual space, the delivery unit 308 delivers, to the user terminal 200, display information with the communication information V2 placed in the virtual space. In a case in which no message is received from the user terminal 200 (NO in Step S209), the delivery unit 308 delivers, to the user terminal 200, display information with no communication information V2 placed in the virtual space (Step S211).

When a log-out request for logging out of the communication system 1 is received from the user terminal 200 or use information has not been received for the predetermined period of time (e.g., one hour), the communication server 300 stops repeating the processing in Steps S206 to S211, and the processing proceeds to Step S212. The specification unit 304 overwrites the status information stored by the user information storage unit 302 in connection with the user ID; that is, the specification unit 304 overwrites the previous status with the log-out status (Step S212). The specification unit 304 deletes the user ID from data stored by the virtual space storage unit 301.

Effects

The communication server 300 according to the first embodiment assigns the virtual space V to the user terminal 200 on the basis of the use information concerning the flavor inhaler 100, and the communication server 300 causes the user terminal 200 to display the image and the like of the virtual space V. The communication server 300 causes the communication information in the form of an object representing a message from at least one user terminal 200 to appear in the virtual space V concerned. The communication server 300 transmits the virtual space V with the message also to the other user terminals 200 assigned with the virtual space V concerned. With the user's act of using the flavor inhaler 100 serving as a trigger, the communication server 300 mediates the communication between the user and other users in this manner. The communication server 300 can provide user experience of feeling that two or more users were using their respective flavor inhalers in the same place, irrespective of their actual use environments.

The communication server 300 according to the first embodiment delivers, to the user terminal 200, display information including both the virtual space V in which the avatar V1 corresponding to the user is placed and the communication information in the form of an object representing a message. In this way, the communication server 300 causes the user terminal 200 to display display information for virtualizing a situation in which the user concerned and other users are using their respective flavor inhalers in the same place. The communication server 300 can thus provide visual user experience of feeling as if two or more users were using their respective flavor inhalers in the same place.

The communication server 300 according to the first embodiment assigns the virtual space V to the user terminal 200 for which the amount of time elapsed from the time of output of the use information (i.e., information on an inhalation (puff) action) is less than or equal to the predetermined period of time. In this way, the communication server 300 appropriately assigns the virtual space V to the user who is currently using the flavor inhaler 100.

Although the first embodiment has been described in detail with reference to the accompanying drawings, specific configurations are not limited to those mentioned above, and various design changes may be made.

The communication server 300 according to the first embodiment described above places, in the virtual space V, the communication information V2 that is an object in the form of a message balloon. In some embodiments, the communication information V2 may be placed in a field that is separate from the virtual space V and is displayed in timeline format. In other embodiments, the communication information V2 may be audio data.

The user terminal 200 according to the first embodiment described above is a terminal such as a smartphone. In some embodiment, the user terminal 200 may, for example, be a head-mounted unit. In this case, the communication server 300 may generate display information that is a stereo image rendered from the viewpoint of the avatar V1 representing the user.

Although the first embodiment above has been described in relation to the user of the flavor inhaler 100, the communication system 1 may be adapted to a user who smokes a cigarette fitted with a mouthpiece with communications capabilities. With this configuration, the mouthpiece is capable of transmitting various pieces of information (e.g., information on cigarette smoking sensed by a sensor) to the smoker's terminal (corresponding to the user terminal 200) or to the communication server 300.

Configuration of Computer

Figure 15:
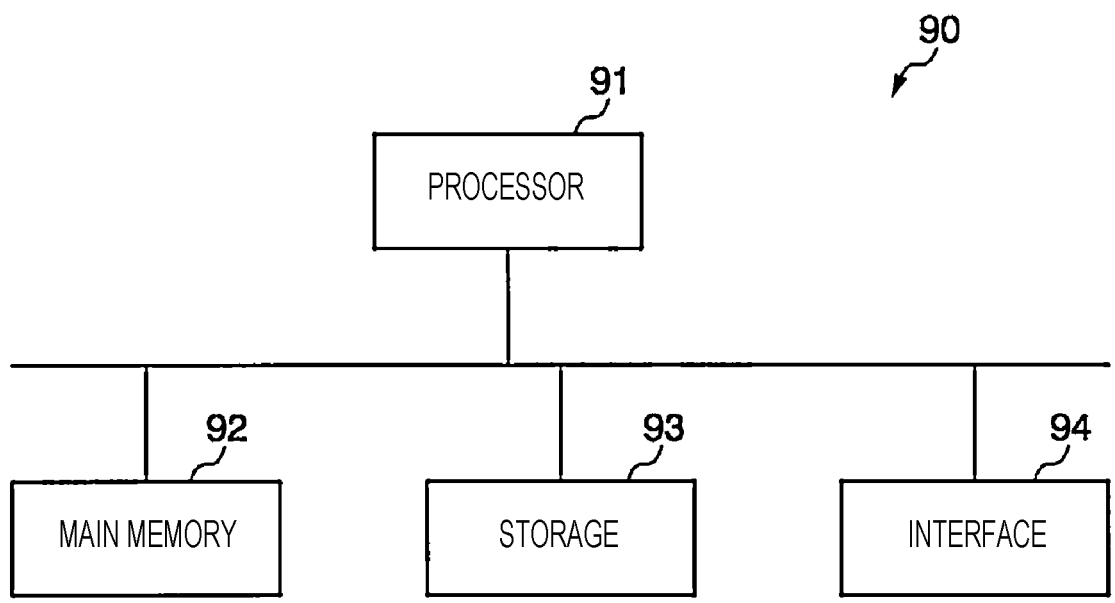
FIG. 15 is a schematic block diagram illustrating the configuration of a computer according to at least one embodiment.

FIG. 15 is a schematic block diagram illustrating the configuration of a computer according to at least one embodiment.

A computer 90 includes a processor 91, a main memory 92, a storage 93, and an interface 94. The flavor inhaler 100, the user terminal 200, and the communication server 300 described above are installed on the respective computers 90. The operation of the processing units described above is stored in the form of a program in the storage 93. The processor 91 reads the program from the storage 93, loads it into the main memory 92, and executes the above-described processing in accordance with the program. The processor 91 allocates, in accordance with the program, storage areas in the main memory 92 to the respective storage units mentioned above. The processor 91 may, for example, be a central processing unit (CPU), a graphic processing unit (GPU), or a microprocessor.

The program may be intended for implementation of some of the functions of the computer 90. For example, these functions may be implemented by the program running in combination with a program prestored in the storage or in combination with a program installed on another device. In some embodiments, the computer 90 may include, in addition to or in place of the constituent elements mentioned above, a custom large-scale integrated circuit (LSI), such as a programmable logic device (PLD). Examples of PLD include programmable array logic (PAL), generic array logic (GAL), a complex programmable logic device (CPLD), and a field programmable gate array (FPGA). In this case, all or some of the functions of the processor 91 may be implemented by the integrated circuit. Such an integrated circuit is an example of the processor.

The storage 93 may, for example, be a hard disk drive (HDD), a solid-state drive (SSD), a magnetic disk, a magneto-optical disk, compact disc read-only memory (CD-ROM), digital versatile disc read-only memory (DVD-ROM), or semiconductor memory. The storage 93 may be an internal medium connected directly to a bus of the computer 90 or may be an external medium connected to the computer 90 through the interface 94 or through a communications line. In a case in which the program is delivered to the computer 90 through the communications line, the computer 90 in receipt of the program may load it into the main memory 92 to execute the processing described above. In at least one embodiment, the storage 93 is a non-transitory tangible storage medium.

The program may be intended for implementation of some of the functions mentioned above. These functions may be implemented by the program running in combination with a program prestored in the storage 93. Such a program is known as a differential file (differential program).

The computer illustrated in FIG. 15 may be the communication server 300, in which case the communication server 300 includes a processor and memory. The processor is configured to execute an instruction stored in the memory. The instruction includes: a reception step for receiving use information transmitted by a user terminal on the basis of an act of using a flavor inhaler; an assignment step for assigning a virtual space to the user terminal on the basis of the use information received; a transmission step for transmitting, to the user terminal, display information for displaying the virtual space; and a delivery step for delivering, to another user terminal assigned with the virtual space, a message transmitted by the user terminal.

INDUSTRIAL APPLICABILITY

The communication server can provide user experience of feeling as if two or more users were using their respective flavor inhalers in the same place, irrespective of their actual use environments.

REFERENCE SIGNS LIST 1 communication system
100 flavor inhaler
200 user terminal
201 display unit
202 communications unit
203 memory 204 storage unit
205 information processing unit
206 operation unit
300 communication server
301 virtual space storage unit
302 user information storage unit
303 communications unit
304 specification unit
305 assignment unit
306 placement unit
307 message reception unit
308 delivery unit
V virtual space
V1 avatar
V2 communication information

The invention claimed is:

1. A communication assistance method, comprising:
a reception step for receiving use information provided as a notification that a flavor inhaler is currently in use and including an attribute information of a user using the flavor inhaler, the use information being transmitted by a user terminal when the flavor inhaler is used;
determining whether a status information associated with the user terminal is a log-out status;
an assignment step for assigning a virtual space to the user terminal whose status information is the log-out status, the virtual space determined from a plurality of virtual spaces provided on an attribute-by-attribute basis on the basis of the attribute information of the user;
overwriting the status information with a log-in status;
a transmission step for transmitting, to the user terminal, display information for displaying the virtual space;
a delivery step for delivering, to another user terminal assigned with the virtual space, a message transmitted by the user terminal; and
overwriting the status information with the log-out status, when a predetermined period of time has elapsed since a time of receipt of most recent use information.

2. The communication assistance method according to claim 1, wherein in the delivery step, display information for displaying the virtual space in which an object representing the message is placed is delivered to the another user terminal.

3. The communication assistance method according to claim 1, further comprising a placement step for placing, in the virtual space, an object representing a character corresponding to the user or to the user terminal, wherein
in the transmission step, display information for displaying the virtual space in which the object is placed is transmitted to the user terminal.

4. The communication assistance method according to claim 3, wherein in the delivery step, display information for displaying the virtual space in which an object representing the message is placed in proximity to the object representing the character is delivered to the another user terminal.

5. The communication assistance method according to claim 1, wherein
in the delivery step, the message transmitted by the user terminal is delivered to another user terminal assigned with the virtual space to which the user terminal is assigned.

6. The communication assistance method according to claim 1, wherein
the reception step is the step in which a communications unit receives use information that is transmitted by the user terminal on the basis of receipt of inhalation information from the flavor inhaler, and
in the assignment step, the user terminal for which an amount of time elapsed from time of receipt of the inhalation information is less than or equal to a predetermined period of time is assigned to the virtual space.

7. A non-transitory computer readable storage medium having a program causing a computer to perform:
a reception step for receiving use information including an attribute information of a user using a flavor inhaler and transmitted by a user terminal provided on an attribute-by-attribute basis on the basis of an act of using the flavor inhaler;
determining whether a status information associated with the user terminal is a log-out status;
an assignment step for assigning a virtual space to the user terminal whose status information is the log-out status, the virtual space determined from a plurality of virtual spaces on the basis of the attribute information of the user;
overwriting the status information with a log-in status;
a transmission step for transmitting, to the user terminal, display information for displaying the virtual space;
a delivery step for delivering, to another user terminal assigned with the virtual space, a message received from the user terminal, and
overwriting the status information with the log-out status, when a predetermined period of time has elapsed since a time of receipt of most recent use information.

8. A communication server, comprising:
a communications unit configured to receive use information including an attribute information of a user using a flavor inhaler and transmitted by a user terminal on the basis of an act of using a flavor inhaler;
a specification unit configured to determine whether a status information associated with the user terminal is a log-out status; and
an assignment unit configured to assign a virtual space to the user terminal whose status information is the log-out status, the virtual space determined from a plurality of virtual spaces provided on an attribute-by-attribute basis on the basis of the attribute information of the user,
wherein the communications unit
transmits, to the user terminal, display information for displaying the virtual space, and
delivers, to another user terminal assigned with the virtual space, a message received from the user terminal,
wherein the specification unit is further configured to:
overwrite the status information with a log-in status, the status information being associated with the user terminal assigned the virtual space, and
overwrite the status information with the log-out status, when a predetermined period of time has elapsed since a time of receipt of most recent use information.

* * * * *